US006444185B1

(12) United States Patent
Nougayrede et al.

(10) Patent No.: US 6,444,185 B1
(45) Date of Patent: Sep. 3, 2002

(54) PROCESS FOR RECOVERING AS SULFUR THE COMPOUNDS H$_2$S, SO$_2$, COS AND/OR CS$_2$ IN A TAIL GAS FROM A SULFUR PLANT

(75) Inventors: Jean Nougayrede, Pau; André Philippe, Orthez; Sabine Savin-Poncet, Buros, all of (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/635,884

(22) Filed: Aug. 10, 2000

Related U.S. Application Data

(63) Continuation of application No. 08/860,534, filed as application No. PCT/FR96/01698 on Oct. 30, 1996, now abandoned.

(30) Foreign Application Priority Data

Nov. 3, 1995 (FR) .............................................. 95 12988
Oct. 25, 1996 (FR) .............................................. 96 13051

(51) Int. Cl.$^7$ ............................................. C01B 17/04
(52) U.S. Cl. ............................... 423/242.1; 423/244.09; 423/573.1; 423/574.1; 423/576; 423/576.8
(58) Field of Search ........................... 423/576.8, 574.1, 423/576, 573.1, 244.09, 242.1

(56) References Cited

U.S. PATENT DOCUMENTS

| 4,311,683 | A | * | 1/1982 | Hass et al. | ............... | 423/573 G |
| 4,988,494 | A | * | 1/1991 | Lagas et al. | ............... | 423/574 R |
| 5,185,140 | A | * | 2/1993 | Kvasnikoff et al. | ...... | 423/574 R |
| 5,202,107 | A | * | 4/1993 | Kvasnikoff et al. | ...... | 423/574 R |
| 5,494,650 | A | * | 2/1996 | Kvasnikoff et al. | ......... | 423/220 |

FOREIGN PATENT DOCUMENTS

| EP | 0 218 302 A2 | * | 4/1987 |
| EP | 0 346 218 A1 | * | 12/1989 |
| EP | 0 424 259 A1 | * | 4/1991 |
| WO | WO 87/02654 | * | 5/1987 |
| WO | WO 94/21359 | * | 9/1994 |
| WO | WO 97/17283 | * | 5/1997 |

OTHER PUBLICATIONS

Copy of English Translation of EP 0 218 302 A2 To Storp et al., Apr. 1987.*

* cited by examiner

*Primary Examiner*—Stanley S. Silverman
*Assistant Examiner*—Timothy C Vanoy
(74) *Attorney, Agent, or Firm*—Townsend and Townsend and Crew LLP

(57) ABSTRACT

A process is provided to recover residual H$_2$S, SO$_2$, COS and CS$_2$ in the tail gas from a sulphur recovery process. The tail gas is oxidized and hydrolyzed at a temperature of from 180° C. to 700° C. to provide an oxidized and hydrolyzed gas stream containing substantially no COS or CS$_2$ and having a concentration by volume of H$_2$S and SO$_2$ such that the H$_2$S concentration minus twice the SO$_2$ concentration is from 0.25% to 0.5%. Then the gas stream from the hydrolysis is passed over a Claus catalyst, for example based on alumina and/or titanium oxide, for the reaction of H$_2$S with SO$_2$ to form sulphur and provide a gas stream with substantially no SO$_2$. The resulting gas stream from the Claus reaction together with a gas containing free oxygen is then passed over an oxidation catalyst, such as one of more oxides or salts of Ni, Co, Fe, Cu, Ag, Mn, Mo, Cr, W or V, deposited on a support, such as bauxite, activated aluminia, silica, titanium oxide, zirconium oxide, zeolite or activated carbon to form sulphur and release a purified gas stream containing substantially no sulphur compounds.

16 Claims, 1 Drawing Sheet

PROCESS FOR RECOVERING AS SULFUR THE COMPOUNDS $H_2S$, $SO_2$, COS AND/OR $CS_2$ IN A TAIL GAS FROM A SULFUR PLANT

RELATED APPLICATIONS

This application is a Continuation of Ser. No. 08/860,534, filed Jun. 30, 1997, now abandoned and filed as a CPA on Jan. 20, 2000 now abandoned and is a National stage filing under 35 USC 371 of International Application Number PCT/FR96/01698, filed Oct. 30, 1996.

Process for virtually total removal of the sulphur compounds $H_2S$, $SO_2$, COS and/or $CS_2$ which are present in a residual gas from a sulphur plant, with recovery of the said compounds in the form of sulphur.

DETAILED DESCRIPTION OF THE INVENTION

The invention relates to a process for the virtually total removal of the sulphur compounds $H_2S$, $SO_2$, COS and/or $CS_2$ which are present in a residual gas from a sulphur plant, with recovery of the said compounds in the form of sulphur.

The residual gases originating from a sulphur plant in which sulphur is produced by the Claus process of controlled oxidation of a sour gas containing $H_2S$, by means of a gas containing free oxygen, contain of the order of 0.2% to 4% by volume of sulphur compounds a large proportion of which consists of $H_2S$, the remainder consisting of $SO_2$, COS, $CS_2$ and sulphur vapour and/or vesicular sulphur.

Such residual gases are commonly treated in order to lower as much as possible the overall content of sulphur compounds therein, with the aim of making it possible to discharge them to the atmosphere, after they have been, burned, while meeting the standards imposed by legislation on atmospheric pollution and simultaneously of recovering these sulphur compounds in a form contributing to increasing the yield of upgradable products formed from the sour gas treated in the sulphur plant.

In citation EP-A-0346218 a process is proposed for the treatment of residual gases which originate from a sulphur plant, in which a controlled oxidation of $H_2S$ in a sour gas is carried out by means of a gas containing free oxygen, and which contain $H_2S$, $SO_2$, COS and/or $CS_2$, the process making it possible to recover virtually all of the compounds COS and $CS_2$ in the form of sulphur. This process consists in bringing the residual gas originating from the sulphur plant into contact with a catalyst of hydrolysis of the compounds COS and $CS_2$ to $H_2S$, placed in an oxidation and hydrolysis unit, the operation being carried out at a temperature which is sufficient to produce a hydrolysed residual gas containing $H_2S$ and $SO_2$ and substantially free from COS and $CS_2$, in passing the hydrolysed residual gas into a purification unit, after having brought the temperature of the said gas to the value required for its flow into the purification unit, causing the compounds $H_2S$ and $SO_2$ in the hydrolysed residual gas to react with each other in the said unit to form sulphur and to obtain, at the exit of this unit, a substantially purified residual gas with a low residual content of sulphur compounds and in continuously adjusting the $H_2S:SO_2$ molar ratio in the hydrolysed residual gas to a value substantially equal to 2:1 at the entry of the purification unit by varying the ratio of the flow rates of sour gas containing $H_2S$ and of gas containing free oxygen which are introduced into the sulphur plant.

In citation EP-A-0424259 an improvement to the above-mentioned process is proposed which makes it possible to improve the quality of the control of the $H_2S:SO_2$ molar ratio in the hydrolysed residual gas entering the purification unit and generally to limit or to reduce the $H_2S$ and $SO_2$ content of the said hydrolysed residual gas. The said improvement consists in maintaining the $H_2S:SO_2$ molar ratio in the residual gas originating from the sulphur plant and entering the oxidation and hydrolysis unit at a value equal to or higher than 2:1 by varying the ratio of the flow rates of sour gas containing $H_2S$ and of gas containing free oxygen which are introduced into the sulphur plant, in introducing into the oxidation and hydrolysis unit a gas flow containing free oxygen and in performing in the said unit an oxidation of $H_2S$ to $SO_2$ and optionally to sulphur by means of the said gas flow in contact with a catalyst of oxidation of the $H_2S$ present in this unit and in maintaining the $H_2S:SO_2$ molar ratio in the hydrolysed residual gas entering the purification unit at the value substantially equal to 2:1 by varying the flow rate of the gas flow containing free oxygen introduced into the oxidation and hydrolysis unit.

Citation EP-A-0218302 describes, inter alia, a process for the treatment of residual gases containing $H_2S$ and $SO_2$ in low concentrations and in an $H_2S:SO_2$ molar ratio of at least 2.2:1 and additionally containing COS and $CS_2$. In such a process the residual gas is first of all subjected to a catalytic hydrolysis carried out at a temperature of 200° C. to 350° C., so as to convert the compounds COS and $CS_2$ into $H_2S$. The hydrolysed residual gas is next brought into contact with a catalyst operating at a temperature ranging from 80° C. to 150° C. in order to carry out the reaction between $H_2S$ and $SO_2$ producing sulphur (2 $H_2S+SO_2 \leftrightarrows 3S+2H_2O$) which sulphur is deposited on the catalyst, and a gaseous effluent containing $H_2S$ as the only sulphur compound. The said gaseous effluent to which an appropriate quantity of oxygen has been added in the form of air (approximately 1.5 times the stoichiometric quantity) is brought into contact with a catalyst of direct oxidation of the $H_2S$ to sulphur ($H_2S+\frac{1}{2}O_2 \rightarrow S+H_2O$), also operating at a temperature of 80° C. to 150° C., producing sulphur, which is deposited on the catalyst, and a desulphurized residual gas.

BRIEF SUMMARY OF THE INVENTION

According to the invention a process is proposed for removal of the sulphur compounds $H_2S$, $SO_2$, COS and/or $CS_2$ which are present in a residual gas from a Claus-type sulphur plant, which constitutes an improvement to the processes described in the abovementioned citations and which results in a more thorough removal of the said sulphur compounds, the result being the possibility, in the case of the whole sour gas treatment unit combining the sulphur plant and the plant using the process according to the invention, of reaching overall sulphur recovery efficiencies of at least 99.9%.

The process according to the invention for the virtually total removal of the sulphur compounds $H_2S$, $SO_2$, COS and/or $CS_2$ which are present in a residual gas from a sulphur plant, which carries out a controlled oxidation of the $H_2S$ in a sour gas by means of a gas containing free oxygen, with recovery of the said sulphur compounds in the form of sulphur, is of the type in which the residual gas originating from the sulphur plant is brought into contact with a catalyst of hydrolysis of the compounds COS and $CS_2$ to $H_2S$, placed in an oxidation and hydrolysis unit, the operation being carried out at a temperature which is sufficient to produce a hydrolysed residual gas containing $H_2S$ and $SO_2$ and substantially free from COS and $CS_2$. the hydrolysed residual gas is passed into a purification unit after having brought the temperature of the said gas to the value required for its flow into this unit, and the compounds $H_2S$ and $SO_2$ in the hydrolysed residual gas are caused to react with each other in the purification unit to form sulphur and to obtain, at the exit of this unit, a substantially purified residual gas containing $H_2S$ as the only sulphur compound and the substantially purified residual gas is introduced into a catalytic oxidation unit containing a catalyst of selective oxidation of $H_2S$ to sulphur and the substantially purified residual gas is maintained in this catalytic oxidation unit in contact with the oxidation catalyst in the presence of a quantity of oxygen which is injected into the said catalytic oxidation unit in the form of a gas stream containing free oxygen in excess in relation to the stoichiometric quantity needed for oxidizing to sulphur the $H_2S$ in the substantially purified residual gas, the oxidation being carried out at temperatures lower than 150° C., and it is characterized in that the $H_2S$ and $SO_2$ concentrations, expressed as volume percentages $(H_2S)$ and $(SO_2)$, are maintained in the hydrolysed residual gas entering the purification unit at values such that the quantity $(H_2S)-2(SO_2)$ is higher than 0.2% without exceeding 0.5% and preferably ranges from 0.25% to 0.5% and more especially from 0.25% to 0.35%, in that the temperature of the substantially purified residual gas introduced into the catalytic oxidation unit is higher than 80° C. without exceeding 100° C., and in that the oxidation of the $H_2S$ to sulphur in the catalytic oxidation unit is carried out at temperatures ranging from 90√ C. to 120° C.

According to one embodiment the maintaining of the said quantity $(H_2S)-2(SO_2)$ at the value higher than 0.2% without exceeding 0.5% and preferably ranging from 0.25% to 0.5% and more especially from 0.25% to 0.35%, in the hydrolysed residual gas entering the purification unit, is carried out by varying the ratio of the flow rates of sour gas containing $H_2S$ and of gas containing free oxygen which are introduced into the sulphur unit.

According to another embodiment the $H_2S:SO_2$ molar ratio in the residual gas originating from the sulphur plant and entering the oxidation and hydrolysis unit is maintained at a value equal to or higher than 2:1 by varying the ratio of the flow rates of sour gas containing $H_2S$ and of gas containing free oxygen which are introduced into the sulphur plant, a gas flow containing free oxygen is introduced into the oxidation and hydrolysis unit and an oxidation of $H_2S$ to $SO_2$ and optionally to sulphur is performed in the said unit, in addition to the hydrolysis of COS and/or $CS_2$ to $H_2S$, by means of the said gas flow in contact with a catalyst of oxidation of the $H_2S$ present in this unit and the quantity $(H_2S)-2(SO_2)$ is maintained at the value higher than 0.2% without exceeding 0.5% and preferably ranging from 0.25% to 0.5% and more especially from 0.25% to 0.35%, in the hydrolysed residual gas entering the purification unit, by varying the flow rate of the gas flow containing free oxygen introduced into the oxidation and hydrolysis unit.

BRIEF DESCRIPTION OF THE DRAWINGS

The figure is a shematic representation of the process of the invention.

The hydrolysis reaction of the compounds COS and $CS_2$ to $H_2S$ and, when it is employed, the oxidation reaction of $H_2S$ which are carried out in the oxidation and hydrolysis unit are advantageously performed at temperatures of between 180° C. and 700° C. and preferably between 250° C. and 400° C.

Figure 1:
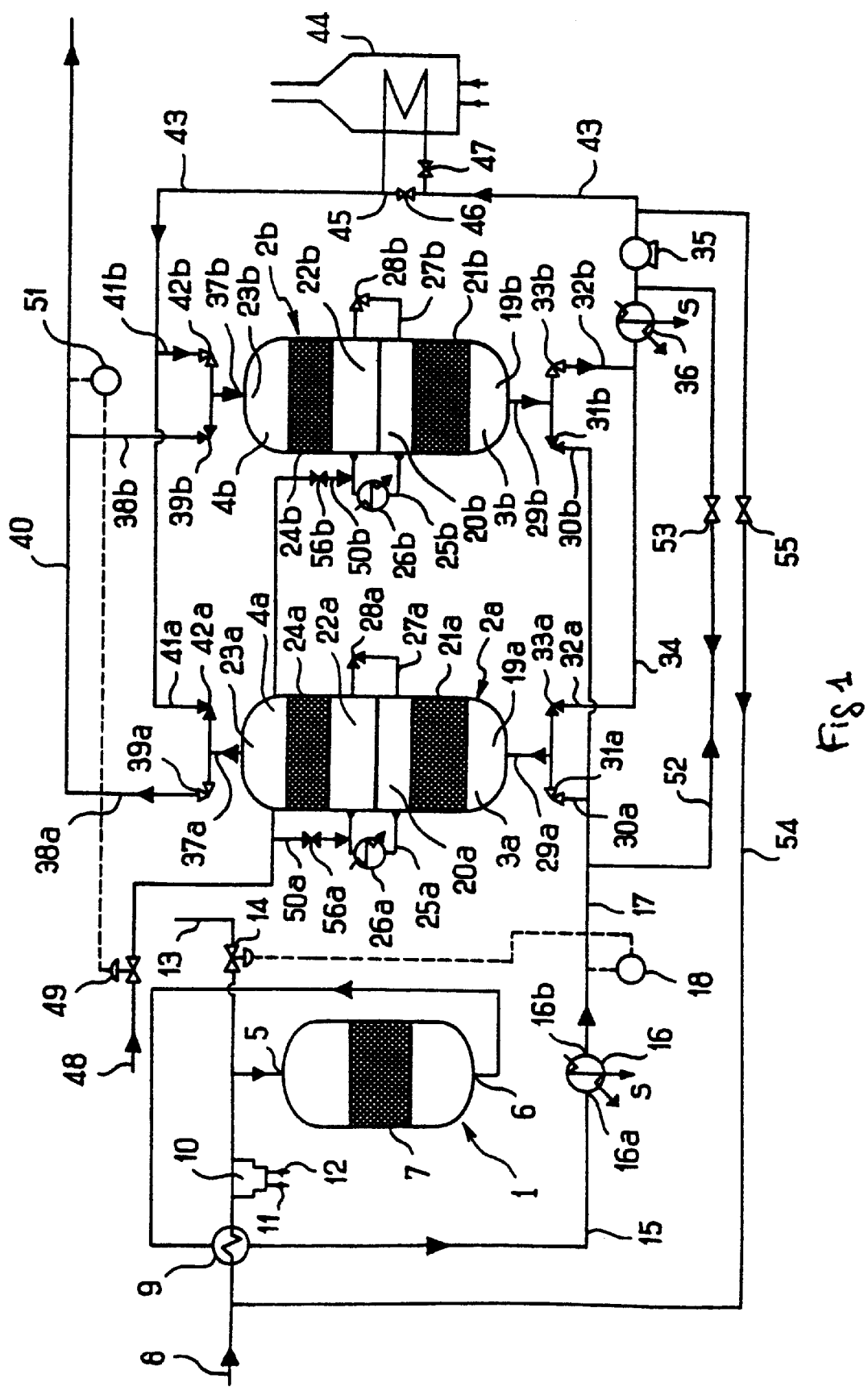

When only a hydrolysis of the compounds COS and $CS_2$ to $H_2S$ is carried out in the oxidation and hydrolysis unit, the said unit contains a catalyst promoting the said hydrolysis reaction. On the other hand, when a hydrolysis of the compounds COS and $CS_2$ to $H_2S$ and an oxidation of $H_2S$ are performed in the oxidation and hydrolysis unit, the unit may contain either a catalyst promoting the hydrolysis reaction and a catalyst promoting the oxidation reaction, which are employed as a mixture or in the form of separate beds or, advantageously, a single catalyst capable of simultaneously promoting both reactions.

Among the catalysts that can be employed for promoting the hydrolysis reaction of the compounds COS and $CS_2$ to $H_2S$ and the oxidation reaction of $H_2S$ there may be mentioned in particular:

the catalysts based on alumina, that is formed by a material containing, by weight, at least 50% and advantageously at least 90% of activated alumina and especially catalysts consisting of activated aluminas chosen from activated aluminas employed for promoting the Claus reaction of sulphur formation between $H_2S$ and $SO_2$;

the catalysts resulting from the association of at least one compound of a metal chosen from Fe, Ni, Co, Cu, Zn, Cr and Mo with a silica and/or alumina support, such as those described in citation FR-A-2327960;

the catalysts resulting from the association of at least one compound of a metal chosen from Fe, Cu, Cd, Zn, Cr, Mo, W, V, Co, Ni and Bi and optionally of at least one compound of a noble metal such as Pt, Pd, Ir and Rh, with a support consisting of an activated alumina stabilized thermally, especially by a small quantity of at least one rare-earth oxide, as described in citation FR-A-2540092, or with a silica and/or titanium oxide support, as indicated in citation FR-A-2511663;

the catalysts containing titanium oxide and in particular the catalysts consisting of titanium oxide, such as those described in citation FR-A-2481145, or else the catalysts containing a mixture of titanium oxide and of a sulphate of an alkaline-earth metal chosen from Ca, Sr, Ba and Mg and in particular the catalysts described in citation EP-A-0060741, in the case of which the ratio of the weight proportion of titanium oxide, expressed as $TiO_2$, to the weight proportion of alkaline-earth metal sulphate in the calcined catalyst may range from 99:1 to 60:40 and more particularly from 99:1 to 80:20, or else the catalysts based on titanium oxide associated with a support such as silica, alumina or zeolite.

The oxidation and hydrolysis catalysts based on alumina have specific surfaces, determined by the nitrogen adsorption method known as the BET method (NF standard X 11-621), ranging advantageously from 5 $m^2/g$ to 400 $m^2/g$ and more particularly from 40 $m^2/g$ to 250 $m^2/g$. The titanium oxide-based oxidation and hydrolysis catalysts have specific surfaces according to the BET method of between 5 $m^2/g$ and 400 $m^2/g$ and more especially between 10 $m_2/g$ and 250 $m^2/g$.

When a gas flow containing free oxygen is injected into the oxidation and hydrolysis unit, the gas flow can be delivered to the unit separately from the sulphur plant residual gas to be treated. However, it is preferred to produce first of all a mixture of the gas flow and of the residual gas and then to introduce the mixture obtained into the oxidation and hydrolysis unit.

The overall residence time of the gases, namely sulphur plant residual gas by itself or mixture of the sulphur plant residual gas and of the gas flow containing free oxygen, in contact with the catalyst or the catalysts present in the oxidation and hydrolysis unit may range from 0.5 second to 10 seconds and in particular from 1 second to 6 seconds, these values being given in the standard conditions of pressure and temperature.

In order to bring the hydrolysed residual gas originating from the oxidation and hydrolysis unit to the required temperature for its flow into the purification unit the operation may be carried out advantageously by indirect heat exchange with a fluid which is at an appropriate temperature.

Maintaining of the quantity $(H_2S)-2(SO_2)$ at the value which is higher than 0.2% without exceeding 0.5% and preferably ranging from 0.25% to 0.5% and more especially from 0.25% to 0.35% in the hydrolysed residual gas entering the purification unit, when the oxidation and hydrolysis unit is solely the site of a hydrolysis of the compounds COS and $CS_2$ to $H_2S$, as well as the maintaining of the $H_2S:SO_2$ molar ratio at the value equal to or higher than 2:1 in the residual gas originating from the sulphur plant, when the oxidation and hydrolysis unit is the site of a hydrolysis of the compounds COS and $CS_2$ to $H_2S$ and of an oxidation of $H_2S$, may be performed by making use of the various known methods of control for maintaining a quantity, here the quantity $(H_2S)-2(SO_2)$ or the $H_2S:SO_2$ molar ratio, at a predetermined value in the gas containing the compounds $H_2S$ and $SO_2$ by varying the ratio of the flow rates of sour gas containing $H_2S$ and of gas containing free oxygen which are introduced into the sulphur plant, the variation being advantageously performed by keeping constant the flow rate of sour gas containing $H_2S$ introduced into the sulphur plant and by varying the flow rate of gas containing free oxygen.

In most of these methods of control, an analysis of a sample of gas containing $H_2S$ and $SO_2$ is performed in order to determine its molar contents of these compounds and to produce from the contents a quantity which is representative of the instantaneous value of the $H_2S:SO_2$ molar ratio or of the quantity $(H_2S)-2(SO_2)$ in the gas, and then a quantity is developed which is representative of the correction flow rate of the gas containing free oxygen delivered to the sulphur plant in order to restore the instantaneous value of the $H_2S:SO_2$ molar ratio or of the quantity $(H_2S)-2(SO_2)$ to the predetermined value, and the quantity thus developed is employed for adjusting the flow rate of the gas containing free oxygen delivered to the sulphur plant, this adjustment in flow rate being performed either on the totality of the flow rate of gas containing free oxygen or only on a small additional flow rate which is added to a larger main flow rate, proportional to the quantity of $H_2S$ present in the sour gas delivered to the sulphur plant. The technique of analysis of the gas sample containing $H_2S$ and $SO_2$ which is employed in these methods of control may be, for example, a technique of analysis using gas phase chromatography (U.S. Pat. No. 3,026,184 and PR-A-2118365), a technique of analysis by absorption in the ultraviolet (The Oil and Gas Journal, Aug. 10, 1970, pages 155 to 157) or else a technique of analysis using interference spectrometry (FR-A-2420754).

In the implementation comprising the introduction of a gas flow containing free oxygen into the oxidation and hydrolysis unit, the maintaining of the quantity $(H_2S)-2(SO_2)$ at the value which is higher than 0.2% without exceeding 0.5% and preferably ranging from 0.25% to 0.5% and more especially from 0.25% to 0.35% in the hydrolysed residual gas entering the purification unit is performed by varying the flow rate of the gas flow containing free oxygen. The methods of control described above can also be employed to do this, the adjustment in the flow rate of the gas flow containing free oxygen being performed on the totality of the flow rate of the flow. The quality of the control of the flow rate of the gas flow containing free oxygen introduced into the oxidation and hydrolysis unit is virtually perfect because, on the one hand, the response time of the system is only a few seconds and, on the other hand, the flow rate of the gas flow to be controlled is low and can therefore be thoroughly adjusted.

The gas containing free oxygen, which is introduced into the sulphur plant in order to perform the controlled oxidation of the $H_2S$ in the sour gas, and the gas stream containing free oxygen, which is injected into the catalytic oxidation unit, and the gas flow containing free oxygen, optionally introduced into the oxidation and hydrolysis unit, are generally air, although it is possible to employ pure oxygen or else oxygen-enriched air or even mixtures, in various proportions, of oxygen and of one or several inert gases other than nitrogen.

According to the invention, sulphur plant denotes any plant into which a sour gas containing $H_2S$ as the only sulphur compound, and a controlled quantity of a gas containing free oxygen are introduced, and a controlled oxidation of the $H_2S$ in the sour gas is performed with the oxygen in the gas containing free oxygen in order to produce sulphur, and at the exit of which a residual gas containing $H_2S$, $SO_2$, COS and/or $CS_2$ is also removed. In particular, the sulphur plant may be a Claus sulphur plant, in which a combustion of a fraction of the $H_2S$ in the sour gas is performed in a combustion zone operating at elevated temperature to produce a gaseous effluent containing $H_2S$ and $SO_2$ and optionally elemental sulphur, and the gaseous effluent, after separation of the sulphur which it may contain, by condensation, is passed in contact with a Claus catalyst placed in one or more a catalytic reaction zones operating at temperatures which are higher than the dew point of the sulphur present in the effluent, to form a new quantity of sulphur by reaction between $H_2S$ and $SO_2$, the sulphur being separated by condensation after each stage of catalytic reaction. In such a Claus sulphur plant the partial combustion of the $H_2S$ in the sour gas to form the effluent containing $H_2S$ and $SO_2$ is carried out at temperatures of between 900° C. and 1600° C., and the reaction between $H_2S$ and $SO_2$, in contact with the Claus catalyst operating at temperatures which are higher than the dew point of the sulphur present in the reaction mixture, is performed at temperatures of between 180° C. and 450° C. in at least one catalytic reaction zone and preferably in a plurality of catalytic reaction zones arranged in series. In this latter case the operating temperatures of the various catalytic reaction zones continually decrease from one catalytic reaction zone to the next. After each of the reaction stages the sulphur produced present in the reaction mixture is separated by condensation and the reaction mixture substantially freed from sulphur is reheated to the temperature chosen for the subsequent reaction stage. The temperature of the residual gas originating from the sulphur plant corresponds substantially to the temperature to which the reaction mixture produced during the last reaction stage in the sulphur plant has been cooled to condense the sulphur which it contains, the temperature being generally between 120° C. and 160° C.

The purification unit in which the hydrolysed residual gas is treated may consist of any plant which makes it possible to produce sulphur by reaction between the $H_2S$ and $SO_2$ and to obtain a substantially purified residual gas containing $H_2S$ as the only sulphur compound in a concentration which is lower than 0.5% by volume. The purification unit may be, in particular, a purification unit in which the sulphur formation reaction between $H_3S$ and $SO_2$ is carried out in contact with a Claus catalyst at temperatures which are higher than the dew point of the sulphur formed or, on the contrary, at temperatures which are lower than the said dew point or, yet again, first of all at temperatures which are higher than the dew point of the sulphur formed and then at temperatures which are lower than the dew point.

In particular, it is possible to use a low-temperature Claus catalytic purification unit in which the hydrolysed residual gas which is at a temperature lower than 160° C. is brought into contact with a Claus catalyst to form sulphur by reaction between $H_2S$ and $SO_2$, the said contact being brought about at a temperature which is lower than the dew point of the sulphur formed, for example between 100° C. and 180° C., in order that this sulphur may be deposited on the Claus catalyst, the sulphur-laden catalyst being at regular intervals subjected to a regeneration by purging by means of a nonoxidizing gas between 200° C. and 500° C., for example between 250° C. and 450° C., to vaporize the sulphur which it retains, and then to cooling by means of a gas at a temperature which is lower than 160° C. to the temperature required for a new bringing into contact with the hydrolysed residual gas, it being possible for the gas to contain water vapour at least during the final stage of the cooling. The purging gas employed for the regeneration of the sulphur-laden Claus catalyst contained in the low-temperature Claus unit may be, for example, methane, nitrogen, $CO_2$ or mixtures of such gases, or may also consist of a fraction of the substantially purified residual gas originating from the low-temperature Claus catalytic purification unit or of a fraction of the hydrolysed residual gas. The purging gas employed for the abovementioned regeneration may optionally contain a certain proportion of a gaseous reducing compound, for example $H_2$, CO or $H_2S$, at least during the final stage of the regeneration, that is to say after the vaporization of most of the sulphur deposited on the Claus catalyst. The low-temperature Claus purification unit may consist of a single low-temperature Claus reaction stage which operates alternately in a Claus reaction phase and in a regeneration/cooling phase. The low-temperature Claus catalytic purification unit is advantageously made up of a plurality of Claus reaction stages which operate in such a way that at least one of the stages operates in a regeneration/cooling phase whereas the other stages are in a low-temperature Claus reaction phase. It is also possible to operate in a low-temperature Claus catalytic purification unit comprising one or more stages in a low-temperature Claus reaction phase, at least one stage in a regeneration phase and at least one stage in a cooling phase.

The substantially purified residual gas which originates from the purification unit and contains $H_2S$ as the only sulphur compound in a concentration lower than 0.5% by volume is injected, at a temperature which is higher than 80° C. without exceeding 100° C. and preferably between 85° C. and 100° C., into the catalytic oxidation unit which contains a catalyst of selective oxidation of $H_2S$ to sulphur. Into this catalytic oxidation unit is also introduced a quantity of oxygen in the form of a gas stream containing excess free oxygen, for example an excess that can range from two to fifteen times the stoichiometric quantity required for oxidizing to sulphur all of the $H_2S$ present in the substantially purified residual gas injected into the catalytic oxidation unit.

To bring the substantially purified residual gas originating from the purification unit to the temperature which is higher than 800° C. without exceeding 100° C. for the introduction into the catalytic oxidation unit it is possible to operate advantageously by indirect heat exchange with a fluid which is at an appropriate temperature.

The gas stream containing free oxygen may be introduced into the catalytic oxidation unit separately from the substantially purified residual gas. It is preferable, however, to premix these two gases before they are injected into the catalytic oxidation unit, in order to obtain a very homogeneous reaction mixture during the contact with the catalyst present in the catalytic oxidation unit.

The contact times of the gaseous reaction mixture formed by bringing the gas stream containing free oxygen and the substantially purified residual gas in the catalytic oxidation unit, into contact with the oxidation catalyst contained in the unit may range from 0.5 second to 20 seconds and more particularly from 1 second to 15 seconds, these values being given in the standard conditions of pressure and temperature.

The oxidation catalyst present in the catalytic oxidation unit may be chosen from the various oxidation catalysts capable of promoting a selective conversion of $H_2S$ to sulphur under the action of oxygen, that is to say of promoting the reaction $H_2S+\frac{1}{2}O_2 \rightarrow S+H_2O$, at temperatures ranging from 90° C. to 120° C., the sulphur formed being deposited on the catalyst.

In particular, the catalyst of selective oxidation of $H_2S$ to sulphur may consist of an active phase consisting of one or more oxides and/or salts of one or more transition metals such as Ni, Co, Fe, Cu, Ag, Mn, Mo, Cr, W and V, which is deposited on a support made of a refractory material such as, for example, bauxite, activated and/or stabilized alumina, silica, titanium oxide, zirconium oxide, zeolites, silica/alumina mixtures, silica/titanium oxide mixtures, silica/zirconium oxide mixtures, refractory carbide, or else on an active carbon support. The oxidation catalyst has a pore volume permitting a considerable sulphur loading. The pore volume of the oxidation catalyst advantageously represents 15 $cm^3$ to 70 $cm^3$ per 100 g of catalyst. The bed of oxidation catalyst present in the catalytic oxidation unit may consist, if need be, of a mixture of different catalysts or of a number of beds of different catalysts such as the abovementioned.

The active phase, calculated as weight of metal, may represent 0.1% to 15% and more especially 0.2% to 7% of the weight of the oxidation catalyst.

In order to implement efficaciously the oxidation of $H_2S$ to sulphur the oxidation catalyst must be maintained at temperatures ranging from 90° C. to 120° C. throughout the stage of oxidation of $H_2S$ in the catalytic oxidation unit. If the $H_2S$ concentration and/or the temperature of the substantially purified residual gas brought into contact with the oxidation catalyst are such that, as a result of the high exothermicity of the reaction of oxidation of $H_2S$ to sulphur, the temperature of the reaction mixture at the end of the oxidation is liable to exceed the temperature of implementing the oxidation, then the heat energy released by the reaction is removed by subjecting the catalyst to cooling by any known method. This cooling may, for example, be performed with the aid of a cold fluid circulating in indirect heat exchange with the catalyst within the latter. It is also possible to operate by placing the catalyst in a tubular reactor consisting of tubes placed in a calandria with the catalyst present in the tubes and a cold fluid circulating between the tubes on the calandria side or vice versa.

During the oxidation of $H_2S$ to sulphur in the catalytic oxidation unit the oxidation catalyst present in this unit becomes gradually laden with sulphur. The regeneration of the sulphur-laden oxidation catalyst is carried out at regular intervals by purging the catalyst with the aid of a nonoxidizing gas, the operation being carried out at temperatures of between 200° C. and 500° C., for example between 250° C.

and 450° C., to vaporize the sulphur retained on the catalyst, and the regenerated catalyst is then cooled to the temperature chosen for a new implementation of the oxidation reaction, this cooling being carried out by means of a gas which is at an appropriate temperature. The coolant gas may be optionally laden with water vapour at least during the final stage of the cooling of the catalyst.

The purging gas employed for regenerating the sulphur-laden oxidation catalyst in the catalytic oxidation unit may be chosen from the purging gases referred to above as being suitable for regeneration of the sulphur-laden Claus catalyst in the low-temperature Claus purification unit.

The catalytic oxidation unit may consist of a single catalytic oxidation stage which operates alternately in a catalytic oxidation phase and in a regeneration/cooling phase. The catalytic oxidation unit is advantageously made up of a plurality of catalytic oxidation stages which operate in such a way that at least one of the said stages is in a regeneration/cooling phase whereas the other stages are in a catalytic oxidation phase. It is also possible to operate in a catalytic oxidation unit comprising one or more stages in a catalytic oxidation phase, at least one stage in a regeneration phase and at least one stage in a cooling phase.

It is possible to implement the Claus catalytic reaction of sulphur formation between $H_2S$ and $SO_2$ at low temperature and the catalytic oxidation of $H_2S$ to sulphur in the same reactor, called a mixed reactor, which comprises two catalytic zones arranged in series, preferably through an indirect heat exchanger, namely a Claus catalytic reaction zone which contains a Claus catalyst capable of promoting the reaction between $H_2S$ and $SO_2$ and which is fed with the hydrolysed residual gas originating from the oxidation and hydrolysis unit and delivers a gas stream containing $H_2S$ as the only sulphur compound in a concentration which is lower than 0.5% by volume and a zone for catalytic oxidation of $H_2S$ to sulphur, which contains a catalyst of selective oxidation of $H_2S$ to sulphur as indicated above, and which is fed simultaneously with the substantially purified residual gas originating from the Claus catalytic reaction zone and with the gas stream containing free oxygen as described above. It is possible to employ a single mixed reactor which operates alternately in a reaction phase (Claus reaction and $H_2S$ oxidation reaction) and in a regeneration/cooling phase. A plurality of mixed reactors are advantageously used which operate in such a way that at least one of the reactors is in a regeneration/cooling phase while the other reactors are in a reaction phase, or else that one or more reactors are in a reaction phase while at least one reactor is in a regeneration phase and at least one reactor is in a cooling phase.

The regeneration of the Claus catalysts and of sulphur-laden catalytic oxidation catalysts present in a mixed reactor and the cooling of the regenerated catalysts may be carried out as shown above in the case of these catalysts.

The gas employed either for the regeneration of the Claus catalyst in the low-temperature Claus purification unit, or for the regeneration of the oxidation catalyst in the catalytic oxidation unit or else for the regeneration of the catalysts present in a mixed reactor, preferably circulates in a closed circuit from a heating zone, successively passing through the catalytic zone or the catalytic zones being regenerated and a cooling zone, in which most of the sulphur which it contains is separated off by condensation, in order to return to the heating zone. Quite obviously, the regenerating gas may also travel in an open circuit.

The gas employed for cooling the regenerated catalyst is of the same type as that employed for the regeneration of the sulphur-laden catalyst. The regenerating gas and the coolant gas circuits may be independent from one another. However, according to one embodiment, the regenerating gas circuit defined above may also comprise a branch connecting the exit of its cooling zone to the entry of the zone being regenerated while bypassing its heating zone, and this makes it possible to short-circuit the heating zone and thus to employ the regenerating gas as coolant gas.

The invention will be understood better on reading the description which is given below, of one of its embodiments employing the plant illustrated diagrammatically in the single figure of the appended drawing.

This plant comprises an oxidation and hydrolysis unit 1 and two mixed reactors 2a and 2b, the reactors being mounted in parallel and each containing, mounted in series, a low-temperature Claus catalytic purification unit, 3a in the case of reactor 2a and 3b in the case of reactor 2b, and a catalytic oxidation unit, 4a in the case of reactor 2a and 4b in the case of reactor 2b.

The oxidation and hydrolysis unit 1 comprises an entry 5 and an exit 6 which are separated from one another by a stationary bed 7 of a catalyst of oxidation of $H_2S$ to sulphur and of hydrolysis of the compounds COS and $CS_2$ to $H_2S$. A gas delivery conduit 8, in which is fitted the cold circuit of an indirect heat exchanger 9 of the gas/gas exchanger type and an in-line burner 10 for supplementary heating, provided with a fuel-gas delivery pipe 11 and with an air delivery pipe 12, connects the entry 5 of the oxidation and hydrolysis unit 1 to the source of residual gas to be treated, for example through the exit of a sulphur plant which is not shown. An air delivery conduit 13 is fitted as a branch on the conduit 8, between the in-line burner 10 and the entry 5 of the oxidation and hydrolysis unit 1, the conduit 13 being equipped with a controllable-opening valve 14. The exit 6 of the oxidation and hydrolysis unit 1 is extended by a discharge circuit 15 for the gases, the conduit being connected, via the hot circuit of the indirect heat exchanger 9, to the entry 16a of an indirect heat exchanger 16, the exit of which 16b is extended by a conduit 17 in which is fitted a controller 18 of the quantity $(H_2S)-2(SO_2)$ in the gas removed from the oxidation and hydrolysis unit, which controller controls the opening of the valve 14 of the conduit 13 for delivering air to the oxidation and hydrolysis unit, and this provides the adjustment of the flow rate of air introduced into the said unit.

In the mixed reactor 2a, the catalytic purification unit 3a has a first end 19a and a second end 20a which are separated by a stationary bed 21a of a catalyst promoting the Claus reaction of sulphur formation between $H_2S$ and $SO_2$, and the catalytic oxidation unit 4a has a first end 22a and a second end 23a which are separated by a stationary bed 24a of a catalyst promoting the selective oxidation of $H_2S$ to sulphur. The second end 20a of the purification unit 3a is adjacent to the first end 22a of the catalytic oxidation unit 4a and communicates with the latter, on the one hand, via a first connecting conduit 25a in which is fitted an indirect heat exchanger 26a and, on the other hand, via a second connecting conduit 27a in which a valve 28a is fitted. Similarly, in the mixed reactor 2b the catalytic purification unit 3b has a first end 19b and a second end 20b which are separated by a stationary bed 21b of a catalyst promoting the Claus reaction of sulphur formation between $H_2S$ and $SO_2$ and the catalytic oxidation unit 4b has a first end 22b and a second end 23b which are separated by a stationary bed 24b of a catalyst promoting the selective oxidation of $H_2S$ to sulphur. The second end 20b of the purification unit 3b is adjacent to the first end 22b of the catalytic oxidation unit 4b and communicates with the latter, on the one hand, via a first connecting conduit 25b in which is fitted an indirect heat exchanger 26b and, on the other hand, via a second connecting conduit 27b in which a valve 28b is fitted. The first end 19a of the purification unit of the mixed reactor 2a is provided with a conduit 29a which is connected, on the one hand, via a conduit 30a provided with a valve 31a, to the conduit 17 extending the indirect heat exchanger 16 and, on the other hand, via a conduit 32a provided with a valve 33a, to a conduit 34, itself connected to the suction orifice of a blower 35 and in which is fitted a sulphur condenser 36. Similarly, the first end 19b of the purification unit of the mixed reactor 2b is provided with a conduit 29b, which is connected, on the one hand, via a conduit 30b provided with a valve 31b, to the abovementioned conduit 17 and, on the other hand, via a conduit 32b provided with a valve 33b, to the said conduit 34 at a point of this conduit situated between the sulphur condenser 36 and the conduit 32a.

The second end 23a of the catalytic oxidation unit 4a of the mixed reactor 2a is provided with a conduit 37a which is connected, on the one hand, via a conduit 38a provided with a valve 39a, to a conduit 40 for discharge of the purified residual gas and, on the other hand, via a conduit 41a provided with a valve 42a, to a conduit 43 extending the delivery orifice of the blower 35. The conduit 43 passes through a heater 44 and carries a branch 45 which is provided with a valve 46 and short-circuits the heater, and it also comprises a valve 47 situated between the heater and the part of the branch 45 upstream of the heater. Similarly, the second end 23b of the catalytic oxidation unit 4b of the mixed reactor 2b is provided with a conduit 37b which is connected, on the one hand, via a conduit 38b provided with a valve 39b, to the said discharge conduit 40 for the purified residual gas and, on the other hand, via a conduit 41b provided with a valve 42b to the conduit 43 between the branch 45 and the conduit 41a.

An air delivery conduit 48 provided with a controllable-opening valve 49 is connected, via a pipe 50a provided with a valve 56a, to the conduit 25a, in the part of the said conduit emerging into the catalytic oxidation unit 4a of the mixed reactor 2a, for the injection of air into the unit and, via a pipe 50b provided with a valve 56b, to the conduit 25b, in the part of the conduit emerging into the catalytic oxidation unit 4b of the mixed reactor 2b. An oxygen content controller 5.1 is fitted in the discharge conduit 40 for the residual gas downstream of the conduits 38a and 38b and controls the opening of the valve 49 of the air delivery conduit 48, and this ensures the adjustment of the flow rate of excess air introduced into the catalytic oxidation unit of each mixed-reactor.

A balancing conduit 52 provided with a valve 53 connects the conduit 17, at a point of the latter conduit situated between the controller 18 and the junction. of the conduit 17 and of the conduit 30a, to the conduit 34, at a point in this conduit 34 which is situated between the blower 35 and the sulphur condenser 36, whereas a purge conduit 54 provided with a valve 55 connects the conduit 43, at a point in the latter situated between the blower 35 and the heater 44, to the conduit 8 at a point in the latter situated upstream of the indirect heat exchanger 9.

Each of the catalyst beds of each mixed reactor may be equipped, if need be, with a system for maintaining the temperature of the catalyst bed, it being possible for the system to be of any known type, as indicated. above.

The way in which the process proceeds in this plant can be outlined as follows.

It is assumed that the mixed reactor 2a is in a reaction phase and that the mixed reactor 2b is in a regeneration phase, valves 31a, 39a, 28b, 33b, 42b, 47 and 56a being open whereas valves 28a, 33a, 42a, 31b, 39b, 46 and 56b are closed, the balancing valve 53 and purge valve 55 being open.

The residual gas to be treated, which originates from a Claus sulphur plant and contains $H_2S$, $SO_2$, COS and $CS_2$, is heated to the appropriate temperature by passing through the indirect heat exchanger 9 and then through the in-line burner 10 and then has added to it air delivered by the conduit 13 via the controllable-opening valve 14 and the mixture obtained flows into the oxidation and hydrolysis unit 1, in which the compounds COS and $CS_2$ which are present in the residual gas are hydrolysed to $H_2S$ in contact with the catalyst present in the oxidation and hydrolysis unit 1, whereas, also in contact with the catalyst, a fraction of the $H_2S$ present in the residual gas is oxidized to $SO_2$ and to sulphur by the oxygen in the air injected via the conduit 13. In addition, the oxidation and hydrolysis unit is also capable of performing the Claus reaction between the $H_2S$ and $SO_2$, above all if the efficiency of the sulphur plant upstream is low, and hence of maintaining the overall $H_2S$ and $SO_2$ content in the hydrolysed residual gas at a level which is sufficiently low for the performance of the plant for the treatment of residual gas not to be affected by a poor efficiency of the sulphur plant. A hydrolysed and oxidized residual gas containing $H_2S$ and $SO_2$, possibly sulphur vapour, and substantially free from COS and $CS_2$ is discharged via the exit 6 of the oxidation and hydrolysis unit. The control of the flow of air introduced into the oxidation and hydrolysis unit 1 ensures the maintenance of a quantity $(H_2S)-2(SO_2)$ which has the chosen value which is higher than 0.2% without exceeding 0.5% and preferably ranging from 0.25% to 0.5% and more especially from 0.25% to 0.35% in the hydrolysed and oxidized residual gas.

After passing through the heat exchanger 9 and then through the heat exchanger 16, the hydrolysed residual gas whose temperature is then between 100° C. and 180° C. is. delivered via the conduit 17 and then the conduits 30a and 29a into the purification unit 3a of the mixed reactor 2a in a reaction phase. In the said purification unit the compounds $H_2S$ and $SO_2$ which are present in the hydrolysed residual gas react with each other in contact with the Claus catalyst present in this purification unit to form sulphur which is deposited on the catalyst. A substantially purified residual gas which contains $H_2S$ as the only sulphur compound in a concentration lower than 0.5% by volume leaves via the conduit 25a. After its temperature has been brought to a value higher than 80° C. without exceeding 100° C., the substantially purified residual gas has added to it, via the conduit 50a, a quantity of air originating from the conduit 48 through the controllable-opening valve 49, which is in excess in relation to the stoichiometric quantity necessary for completely oxidizing to sulphur all of the $H_2S$ in the said substantially purified residual gas, and the mixture obtained is injected into the end 22a of the catalytic oxidation unit 4a of the mixed reactor 2a. The excess air injected into the catalytic oxidation unit 4a is controlled in order to permit the total removal of the $H_2S$ in the purified residual gas. In the catalytic oxidation unit 4a which, just like the catalytic oxidation unit 4b of the mixed reactor 2b, contains a catalyst of selective oxidation of $H_2S$ to sulphur and, for example, a catalyst as described above, the $H_2S$ in the substantially purified residual gas is selectively oxidized to sulphur by the oxygen in contact with the oxidation catalyst, according to the reaction $H_2S+\frac{1}{2}O_2 \rightarrow S+H_2O$ at the operating temperatures ranging from 90° C. to 120° C., the sulphur formed being deposited on the catalyst.

A virtually totally purified residual gas leaves via the conduit 37a of the mixed reactor 2a and is directed by the conduit 38a, through the valve 39a, into the conduit 40 for discharging the purified residual gas. The $H_2S$ content of the substantially purified residual gas entering the catalytic oxidation reactor 4a remains low whatever the efficiency of the sulphur plant and the efficiency of the whole plant is independent of the efficiency of the sulphur plant.

A stream of nonoxidizing purging gas is conveyed by the blower 35 into the conduit 43 through the valve 47 and the heater 44, in which this gas stream is heated to the appropriate temperature for regeneration. The heated gas stream travelling in the conduit 43 is introduced into the mixed reactor 2b via the conduit 41b, through the valve 42b and the conduit 37b and first of all purges the sulphur-laden catalytic oxidation catalyst 24b present in the catalytic oxidation unit 4b of the mixed reactor 2b and then, after passing through the conduit 27b through the valve 28b, the sulphur-laden Claus catalyst 21b present in the purification unit 3b of the said mixed reactor 2b. The purging gas stream carrying away the vaporized sulphur leaves the mixed reactor 2b via the conduit 29b and flows via the conduit 32b through the valve 33b to the sulphur condenser 36, in which most of the sulphur is separated off by condensation. At the exit of the condenser 36 the purging gas stream is taken up again by the blower 35 to be delivered into the conduit 43 as indicated above.

After a sufficient period of purging of the catalysts present in the mixed reactor 2b by the purging gas passing through the heater 44, in order to remove completely the sulphur deposited on the catalysts, the valve 46 is opened and the valve 47 is closed so as to short-circuit the heater 44 and to lower the temperature of the purging gas, and the purging is continued for an appropriate period in order to cool the regenerated catalysts 21b and 24b which are present in the mixed reactor 2b.

When the catalysts have been cooled to a suitable temperature enabling them to be used again in a reaction phase, the functions of the mixed reactors 2a and 2b are switched round, that is to say that the reactor 2b is brought into a Claus reaction and catalytic oxidation phase and the reactor 2a to a regeneration/cooling phase, by closing the valves 31a, 39a, 28b, 33b, 42b, 46 and 56a and by opening the valves 28a, 33a, 42a, 31b, 39b, 47 and 56b. During the transition period of switching of the functions of the mixed reactors 2a and 2b the purging gas is circulated in a conduit, not shown, by passing these reactors.

To complete the description of the process according to the invention which is given above, an example of implementation of the said process is given below, no limitation being implied.

EXAMPLE

A residual gas from a sulphur plant which had the following composition in percentage by volume, except for sulphur vapour and vesicular sulphur, was treated by using a plant similar to that shown diagrammatically in the figure of the appended drawing and operating as described above.

| | | |
|---|---|---|
| $H_2S$: 1.35 | $H_2O$: 33.22 | CO: 0.34 |
| $SO_2$: 0.43 | $N_2$: 58.47 | COS: 0.01 |
| $CO_2$: 3.37 | $H_2$: 2.80 | $CS_2$: 0.01 |

The residual gas originated from a Claus sulphur plant in which the controlled oxidation, using air, of a sour gas consisting, by volume, of 90% of $H_2S$, 5.4% of $CO_2$, 4% of water and 0.6% of hydrocarbons was being performed.

The recovery efficiency of the sulphur plant supplying the residual gas was 94.5%.

The oxidation and hydrolysis unit contained a catalyst promoting both the hydrolysis of the compounds COS and $CS_2$ to $H_2S$ and the oxidation of $H_2S$, the catalyst consisting of extrudates, 4 mm in diameter, of titanium oxide containing 10% by weight of calcium sulphate.

In each of the mixed reactors 2a and 2b, the low-temperature Claus purification unit, 3a and 3b respectively, contained a Claus catalyst consisting of beads, 2 to 5 mm in diameter, of an activated alumina impregnated with 7% by weight of titanium oxide and exhibiting a specific surface, determined by the BET nitrogen adsorption method, of approximately 240 $m^2/g$ and, the catalytic oxidation unit, 4a and 4b respectively, contained a catalyst of selective oxidation of $H_2S$ to sulphur, consisting of an alumina with nickel containing, by weight, 4% of nickel, the catalyst being obtained by impregnating an alumina with the aid of the appropriate quantity of nickel acetate in aqueous solution and then drying the impregnated alumina at 100° C. and finally calcining the dried product for 3 hours. This catalyst had a pore volume of 55 $cm^3$ per 100 g of catalyst.

The residual gas to be treated, arriving from the sulphur plant at a flow rate of 380 kmol/h, was heated to 283° C. after passing through the indirect heat exchanger 9 and then through the in-line burner 10 and then had added to it 2.5 kmol/h of air to obtain, in the hydrolysed residual gas leaving the hydrolysis and oxidation unit 1, $H_2S$ and $SO_2$ contents, expressed as volume percentages ($H_2S$) and ($SO_2$) such that $(H_2S)-2(SO_2)=0.25\%$. The mixture of residual gas and of air which was obtained was introduced at the temperature of 283° C. into the oxidation and hydrolysis unit 1. The residence time of the reaction mixture in contact with the catalyst present in the said unit 1 was 4 seconds in standard conditions of pressure and temperature. The hydrolysed and oxidized residual gas leaving the oxidation and hydrolysis unit now contained only traces of COS and $CS_2$, the degree of hydrolysis of these compounds being higher than 99%, and its overall $H_2S$ and $SO_2$ content was lower than that which could be forecast merely from reactions of hydrolysis of COS and $CS_2$ and of the oxidation of a fraction of $H_2S$ to $SO_2$ which indicates that sulphur has also been formed by the Claus reaction. The temperature at the exit of the oxidation and hydrolysis unit 1 was 300° C., the oxidized and hydrolysed residual gas no longer containing any oxygen.

The oxidized and hydrolysed residual gas was next cooled to 130° C. by passing through the indirect heat exchanger 9 and then through the heat exchanger 16 and was then injected at this temperature and with $H_2S$ and $SO_2$ contents maintained at values such that $(H_2S)-2(SO_2)=0.25\%$, by the controller 18 acting on the valve 14 fitted in the conduit 13, into the low-temperature Claus purification unit 3a of the mixed reactor 2a operating in a reaction phase. In the said unit 3a the compounds $H_2S$ and $SO_2$ present in the hydrolysed residual gas reacted with each other in contact with the Claus catalyst to form sulphur, which was deposited on the catalyst, and a substantially purified residual gas at a temperature of approximately 145° C. and containing $H_2S$ as the only sulphur compound in a concentration of 2500 ppm by volume was discharged from the purification unit 3a via the conduit 25a. The said substantially purified residual gas was cooled to 90° C. in the indirect heat exchanger 26a and then had air added to it in a quantity representing 3.3 times the stoichiometric quantity needed for a complete oxidation of $H_2S$ to sulphur, and the mixture obtained was injected into the end 22a of the catalytic oxidation unit 4a. In contact with the oxidation catalyst present in the catalytic oxidation unit 4a the $H_2S$ in the substantially purified residual gas was oxidized virtually totally to sulphur by the oxygen in the air added to the said residual gas, the said sulphur being deposited on the catalyst. A purified residual gas was discharged from the catalytic oxidation unit 4a of the mixed reactor 2a via the conduit 37a and was conveyed via the conduit 38a, through the valve 39a, into the conduit 40 for discharging the treated residual gas. The treated residual gas, the temperature of which was 107° C., now contained only traces of sulphur compounds, namely less than 200 ppm by volume, as well as a quantity of oxygen representing the excess maintained by the controller 51 acting on the controllable-opening valve 49 in the conduit 48, not consumed during the catalytic oxidation phase in the catalytic oxidation unit 4a of the mixed reactor 2a.

The purging gas employed for the regeneration of the sulphur-laden catalysts present in the mixed reactor 2b in a phase of regeneration and then cooling, consisted of a portion of the cooled oxidized and hydrolysed residual gas taken from the conduit 17 via the conduit 52. The purging gas was introduced via the conduit 37b into the mixed reactor 2b in a regeneration phase after having been taken to a temperature of between 250° C. and 350° C. in the heater 44 of the regeneration circuit. The sulphur-laden purging gas originating from the mixed reactor 2b in a regeneration phase via the conduit 29b next passed into the sulphur condenser 36 of the regeneration circuit, in order to be cooled therein to approximately 125° C. so as to separate most of the sulphur which it contained and it then returned to the heater 44 to be employed again for the regeneration. The regenerated catalysts were next cooled by passing, through the mixed reactor containing them, the purging gas originating from the condenser 36 and travelling via the branch 45 short-circuiting the heater 44.

The mixed reactors 2a and 2b operated alternately for 30 hours in a reaction phase and for 30 hours, including 10 hours' cooling, in a regeneration/cooling phase.

The sulphur yield of the whole unit comprising the sulphur plant supplying the residual gas to be treated, the oxidation and hydrolysis unit 1 and the mixed reactors 2a and 2b, each containing a low-temperature Claus purification unit, 3a and 3b respectively, followed by a catalytic oxidation unit, 4a and 4b respectively, was higher than 99.9%.

What is claimed is:

1. A process for the removal of sulphur compounds $H_2S$, $SO_2$, COS and/or $CS_2$ out of a residual gas from a sulphur plant comprising the steps of:

(a) contacting the residual gas originating from the sulphur plant, wherein the $H_2S$ to $SO_2$ molar ratio in the residual gas has a value equal to or higher than 2:1, with a catalyst for hydrolysis of the compounds COS and $CS_2$ to $H_2S$, in an oxidation and hydrolysis unit, wherein a gas flow containing free oxygen is injected into the oxidation and hydrolysis unit and an oxidation of $H_2S$ to $SO_2$, and optionally to sulphur is performed in the unit, in addition to the hydrolysis of COS and $CS_2$ to $H_2S$, the operation being carried out at a temperature which is sufficient to produce a hydrolyzed residual gas containing $H_2S$ and $SO_2$ and is substantially free from COS and $CS_2$;

(b) passing the hydrolyzed residual gas, after having brought the temperature of the gas to a value lower than 160° C. into a Claus catalytic purification unit in which said gas is brought into contact with a Claus catalyst to form sulphur by reaction between $H_2S$ and $SO_2$, the contact being performed at a temperature which is below the dew point of the sulphur formed to deposit sulphur on the Claus catalyst and to discharge from the unit, a substantially purified residual gas containing $H_2S$ as the only sulphur compound, the $H_2S$ concentrations, expressed as volume percentages ($H_2S$) and ($SO_2$), in the hydrolyzed residual gas entering the purification unit being maintained at values such that the quantity $(H_2S)-2(SO_2)$ ranges from 0.25% to 0.5% by varying the flow rate of the gas flow containing free oxygen introduced into the oxidation and hydrolysis unit; and (c) introducing the substantially purified residual gas and a gas stream containing free oxygen, at a temperature of between 85° C. and 100° C. into a catalytic oxidation unit containing a catalyst for selective oxidation of $H_2S$ to sulphur, the quantity of oxygen in the gas stream being in excess in relation to the stoichiometric quantity needed for oxidizing $H_2S$ to sulphur in the substantially purified residual gas, and maintaining the substantially purified residual gas and the gas stream containing free oxygen in this catalytic oxidation unit in contact with the oxidation catalyst at a temperature ranging from 90° C. to 120° C. to oxidize $H_2S$ into sulphur which deposits on the oxidation catalyst and to discharge from the oxidation zone a purified residual gas virtually free of sulphur compounds.

2. The process according to claim 1, wherein the oxidation and hydrolysis unit contains a single catalyst promoting both the hydrolysis of the compounds COS and $CS_2$ to $H_2S$ and the oxidation of $H_2S$.

3. The process of claim 2, wherein the oxidation and hydrolysis unit operates at a temperature from 250° C. to 400° C.

4. The process according to claim 1, wherein the overall residence time of the gases in contact with the catalyst or the catalysts present in the oxidation and hydrolysis unit ranges from 0.5 second to 10 seconds.

5. The process of claim 4, wherein the residence time of the gases in cout act with the catalyst is from 1 to 6 seconds.

6. The process according to claim 1, wherein the purification unit is a low-temperature Claus catalytic purification unit in which the hydrolyzed residual gas which is at a temperature lower than 160° C. is brought into contact with a Claus catalyst to form sulphur by reaction between $H_2S$ and $SO_2$, the contact being brought about at a temperature which is lower than the dew point of the sulphur formed to deposit sulphur on the Claus catalyst, the sulphur-laden catalyst being at regular intervals subjected to a regeneration by purging with a non-oxidizing gas at a temperature from 200° C. to 500° C. to vaporize the sulphur, and then to a cooling by means of contact with a gas having a temperature lower than 160° C. until reaching the temperature required for contact with the hydrolyzed residual gas, the coolant gas optionally containing water vapor at least during the final stage of the cooling.

7. The process according to claim 6, wherein the low-temperature Claus catalytic purification unit and the catalytic oxidation unit comprise a Claus catalytic reaction zone and a zone for catalytic oxidation of $H_2S$ to sulphur, which are arranged in series in the same reactor, called a mixed reactor.

8. The process according to claim 7, wherein the Claus catalyst and the catalyst for oxidation of $H_2S$ which are present in the mixed reactor are regenerated successively by purging with the same regenerating gas and are cooled successively with the same coolant gas, the coolant gas optionally containing water vapor at least during the final stage of the cooling.

9. The process according to claim 1, wherein the contact time of the gases with the oxidation catalyst present in the catalytic oxidation unit, ranges from 0.5 second to 20 seconds.

10. The process of claim 9, wherein the contact time of the gases with the oxidation catalyst is from 1 to 15 seconds.

11. The process according to claim 1, wherein the sulphur-laden oxidation catalyst present in the catalytic oxidation unit is regenerated by purging the catalyst by means of a non-oxidizing gas, the operation being carried out at temperatures of between 200° C. and 500° C., to vaporize the sulphur retained on the catalyst, and a regenerated catalyst is then cooled to a temperature, for the catalytic oxidation reaction, the cooling being carried out by means of a gas which is at an appropriate temperature, which coolant gas optionally contains water vapor at least during the final stage of the cooling.

12. The process of claim 11, wherein the purging operation is carried out at a temperature from 250° C. to 450° C.

13. The process of claim 1, wherein the oxidation and hydrolysis unit operates at a temperature from 250° C. to 400° C.

14. The process of claim 1, wherein the contact between the hydrolyzed residual gas and the Claus catalyst is performed at a temperature between 100° C. and 180° C.

15. The process of claim 1, wherein the $H_2S$ and $SO_2$ concentrations in the hydrolyzed residual gas entering the purification unit have values such that the quantity $(H_2S)-2(SO_2)$ ranges from 0.25% to 0.35%.

16. A process for removing sulfur compounds $H_2S$, $SO_2$, COS and/or $CS_2$ from a sulfur plant residual gas comprising:

(a) contacting the residual gas from the sulfur plant, wherein the molar ratio of $H_2S$ to $SO_2$ in the residual gas is 2:1 or higher, with a catalyst for hydrolysis of the compounds COS and $CS_2$ to $H_2S$, in an oxidation and hydrolysis unit, wherein a gas flow containing free oxygen is injected into the oxidation and hydrolysis unit and an oxidation of $H_2S$ to $SO_2$, and optionally to sulphur is performed in the unit, in addition to the hydrolysis of COS and $CS_2$ to $H_2S$, the operation being carried out at a temperature which is sufficient to produce a hydrolyzed residual gas containing $H_2S$ and $SO_2$ and is substantially free from COS and $CS_2$;

(b) passing the hydrolyzed residual gas, after having brought the temperature of the gas to a value lower than 160° C. into a Claus catalytic purification unit in which said gas is brought into contact with a Claus catalyst to form sulfur by reaction between $H_2S$ and $SO_2$, the contact being performed at a temperature which is below the dew point of the sulfur formed to deposit sulfur on the Claus catalyst and to discharge from the unit, a substantially purified residual gas containing $H_2S$ as the only sulfur compound, the $H_2S$ concentrations, expressed as volume percentages $(H_2S)$ and $(SO_2)$, in the hydrolyzed residual gas entering the purification unit being maintained at values such that the quantity $(H_2S)-2(SO_2)$ ranges from 0.25% to 0.5% by varying the flow rate of the gas flow containing free oxygen introduced into the oxidation and hydrolysis unit;

(c) introducing the substantially purified residual gas and a gas stream containing free oxygen, at a temperature of between 85° C. and 100° C. into a catalytic oxidation unit containing a catalyst for selective oxidation of $H_2S$ to sulfur, the quantity of oxygen in the gas stream being in excess in relation to the stoichiometric quantity needed for oxidizing $H_2S$ to sulfur in the substantially purified residual gas, and maintaining the substantially purified residual gas and the gas stream containing free oxygen in this catalytic oxidation unit in contact with the oxidation catalyst at a temperature ranging from 90° C. to 120° C. to oxidize $H_2S$ into sulfur which deposits on the oxidation catalyst and to discharge from the oxidation zone a purified residual gas virtually free of sulfur compounds;

(d) subjecting the sulfur-laden catalyst contained in the purification unit, at regular intervals, to a regeneration by purging with a non-oxidizing gas at a temperature from 200° C. to 500° C. to vaporize the sulfur, and then to a cooling by means of contact with a gas having a temperature lower than 160° C. until reaching the temperature for contact with the hydrolyzed residual gas, the coolant gas optionally containing water vapor at least during the final stage of the cooling; and (e) regenerating the sulfur-laden oxidation catalyst present in the catalytic oxidation unit by purging the catalyst by means of a non-oxidizing gas, the operation being carried out at temperatures of between 200° C. and 500° C., to vaporize the sulfur retained on the catalyst and produce a regenerated catalyst, and then cooling the regenerated catalyst to a temperature for the catalytic oxidation reaction, the cooling being carried out by means of a gas which is at an appropriate temperature, which coolant gas optionally contains water vapor at least during the final stage of the cooling, wherein the Claus catalytic purification unit and the catalytic oxidation unit comprise a Claus catalytic reaction zone and a zone for catalytic oxidation of $H_2S$ to sulfur, which are arranged in series in the same reactor, called a mixed reaction, and wherein the Claus catalyst and the catalyst for oxidation of $H_2S$ which are present in the mixed reactor are regenerated successively by purging with the same regenerating gas and are cooled successively with the same coolant gas.

* * * * *

UNITED STATES PATENT AND TRADEMARK OFFICE
CERTIFICATE OF CORRECTION

PATENT NO. : 6,444,185 B1
APPLICATION NO. : 09/635884
DATED : September 3, 2002
INVENTOR(S) : Jean Nougayrede, Andre Phillipe and Sabine Savin-Poncet It is certified that error appears in the above-identified patent and that said Letters Patent is hereby corrected as shown below:

In the claims:
    Claim 4 in Column 16, lines 38-41, should read --The process according to claim 1, wherein the overall residence time of the gases in contact with the catalyst or the catalysts present in the oxidation and hydrolysis unit, expressed in the standard conditions of pressure and temperature, ranges from 0.5 second to 10 seconds.--.
    Claim 5 in Column 16, line 41, "cout act" should read --contact--.

Signed and Sealed this

Twelfth Day of September, 2006

JON W. DUDAS
*Director of the United States Patent and Trademark Office*